No. 650,000. Patented May 22, 1900.
Z. T. WINFREE.
POTATO DIGGER.
(Application filed Feb. 23, 1900.)
(No Model.)
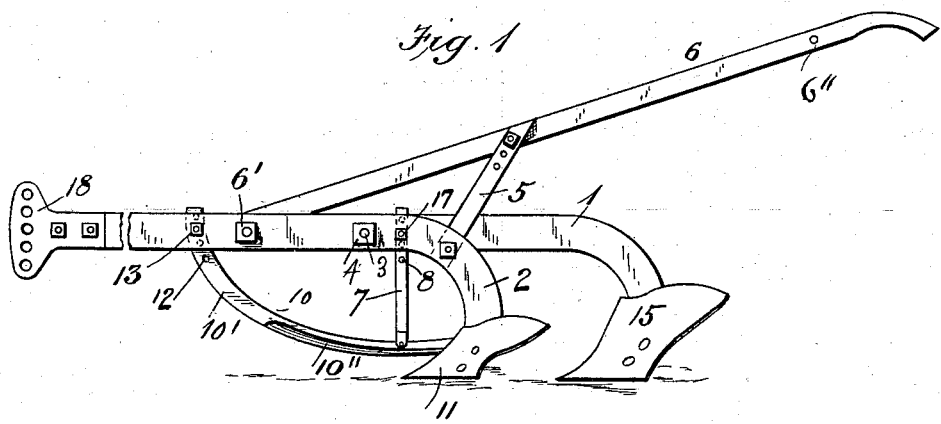
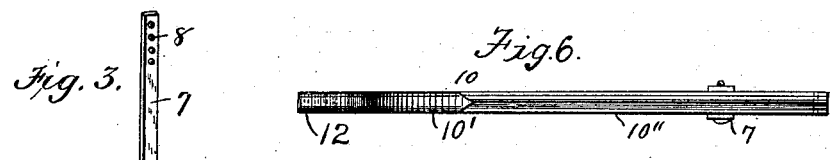
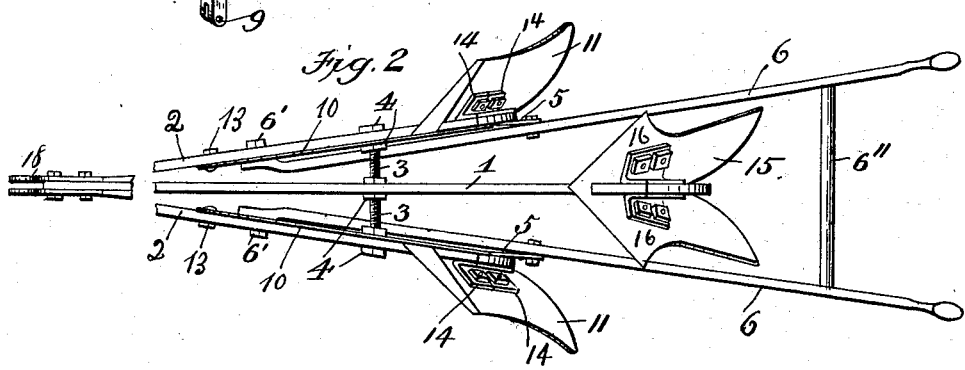
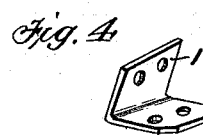
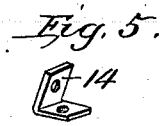
WITNESSES:
INVENTOR
Z. T. Winfree
BY
ATTORNEY

UNITED STATES PATENT OFFICE.

ZACHARY T. WINFREE, OF MONT BELVIEU, TEXAS, ASSIGNOR OF ONE-EIGHTH TO ADALESA M. LAWRENCE, OF SAME PLACE, AND ELIZABETH A. WRIGHT, OF CEDAR BAYOU, AND ANDREW DOW, OF HOUSTON, TEXAS.

POTATO-DIGGER.

SPECIFICATION forming part of Letters Patent No. 650,000, dated May 22, 1900.

Application filed February 23, 1900. Serial No. 6,300. (No model.)

*To all whom it may concern:*

Be it known that I, ZACHARY T. WINFREE, a citizen of the United States, residing at Mont Belvieu, in the county of Chambers and State of Texas, have invented certain new and useful Improvements in Potato-Diggers, of which the following is a specification.

My invention is designed to cut away the vines and to throw them out of the way of the plow-points, throw the outer portion of the ridges to the right and left, and then to turn out the middles, exposing the potatoes to view.

In the accompanying drawings, Figure 1 is an elevation of my invention. Fig. 2 is a bottom plan view. Fig. 3 is a perspective view of one of the arms. Fig. 4 is a perspective view of one of the brackets for holding the shovel-plow to the foot. Fig. 5 is a perspective view of one of the brackets for holding the plowshares to the feet, and Fig. 6 is an edge view of one of the side rods.

My invention consists of the central beam 1, running backward and turning down at its rear end. To each side of the central beam is secured a side beam 2. These side beams are not so long as the center beam and do not reach back so far, and they spread as they reach rearwardly, and the distance between these beams 1 and 2 is regulated by a threaded rod 3, the rod being adjusted and secured by nuts 4. Secured to the two side beams are standards 5, extending upwardly, and adjustably secured to these standards are plow-handles 6, the front ends of which are secured to the inner faces of side beams 2 by bolts and nuts 6'. The rear ends of these plow-handles are braced by a cross-rod 6''. To the inner faces of the side beams 2 are adjustably and vertically secured arms 7, said arms being provided at their upper ends with perforations 8, their lower ends being bifurcated, and each arm of the bifurcation being provided with a perforation 9. In each one of these bifurcated ends of the arms 7 is secured the rear end of a side runner 10, the rear ends of these runners extending to the front edges of plowshares 11. The front ends of these runners curve upwardly and are vertically and adjustably secured to the inner faces of said beams 2, said front ends being provided with perforations 12 and secured to said beams 2 by means of bolts and nuts 13. The front and lower edges 10' of each one of these runners 10 are flat about one-third of the length of the runner. The balance of the lower edge 10'' is sharp. As the machine moves along the front ends and flat part of these runners press the vines down and their rear parts 10'' cut them off, and the plowshares 11 turn them under and away from the ridge.

The plowshares 11 are wing-shaped and are each adapted to turn a mold of earth from the edges of the ridge into the middle between the rows, and their points extend some few inches below the edges of the cutting-blades. These plowshares 11 are secured to the feet of said side beams 2 by means of right-angle brackets 14, two or more being used to secure each plowshare in place, one end of said brackets 14 being bolted to the outer face of the foot and the other to the rear face of the plowshares.

To the foot of the beam 1, in rear of plowshares 11 and midway between the two, is secured a double-winged shovel-plow 15, secured to the foot of said beam by two brackets 16, one on each side of the foot, one end of said brackets being secured to the sides of the foot and the other ends to the rear face of said shovel-plow.

The blades 10 are vertically and adjustably secured by means of perforations 8 in the upper ends of arms 7 and bolts and nuts 17, the bolts passing through one of the perforations 8 and through the beam 2, the front ends of said blades being adjustably secured by means of perforations 12 and bolts and nuts 13.

To the front end of the central beam 1 is secured a perforated head 18.

Having described my invention, what I claim as new, and desire to secure by Letters Patent, is—

1. A sweet-potato digger, consisting of the central beam 1, turning downwardly at its rear end; a double-winged shovel-plow 15, secured to said rear end; side beams, one secured to each side of said central beam, turning downwardly at their rear ends and in advance of the rear end of beam 1, and each having secured to its foot, a wing-shaped plowshare 11; threaded bolt 3, working through beam 1 and between beams 2; nuts 4, working on said bolt and adjusting the distance between said beams; arms 7, adjustably secured to side beams 2; curved runners 10, their front ends and lower edges 10' flat, their rear ends and lower edges 10", tapering to an edge, their rear ends secured to the lower ends of standards 7, and above the points of the plowshares 11, their front ends adjustably secured to the said side beams; handles 6, secured to said beams; perforated head 18, secured to the forward end of the central beam, substantially as shown and described and for the purposes set forth.

2. A sweet-potato digger, consisting of three beams turning downwardly at their rear ends forming plow-standards, the two side beams being shorter than the central beam; a threaded rod, working through said beams and having means to adjust the distance between said beams; a double-shovel plow, secured to the rear end of the central beam; plowshares, secured to the rear ends of the side beams; standards, one adjustably secured to each of the side beams, a short distance in advance of the plowshares; side runners, their rear ends secured to said standards, above the points of the plowshares, their front ends, vertically and adjustably secured to said side beams; a draft-head, secured to the front ends of said beams, and handles secured above and to said beams, substantially as shown and described and for the purposes set forth.

In testimony whereof I affix my signature in presence of two witnesses.

ZACHARY T. WINFREE.

Witnesses:
  W. J. MOORE,
  T. J. COLLINS, Jr.